No. 681,147. Patented Aug. 20, 1901.
J. A. STONE.
CORN HARVESTER.
(Application filed May 7, 1900.)
(No Model.) 2 Sheets—Sheet 1.
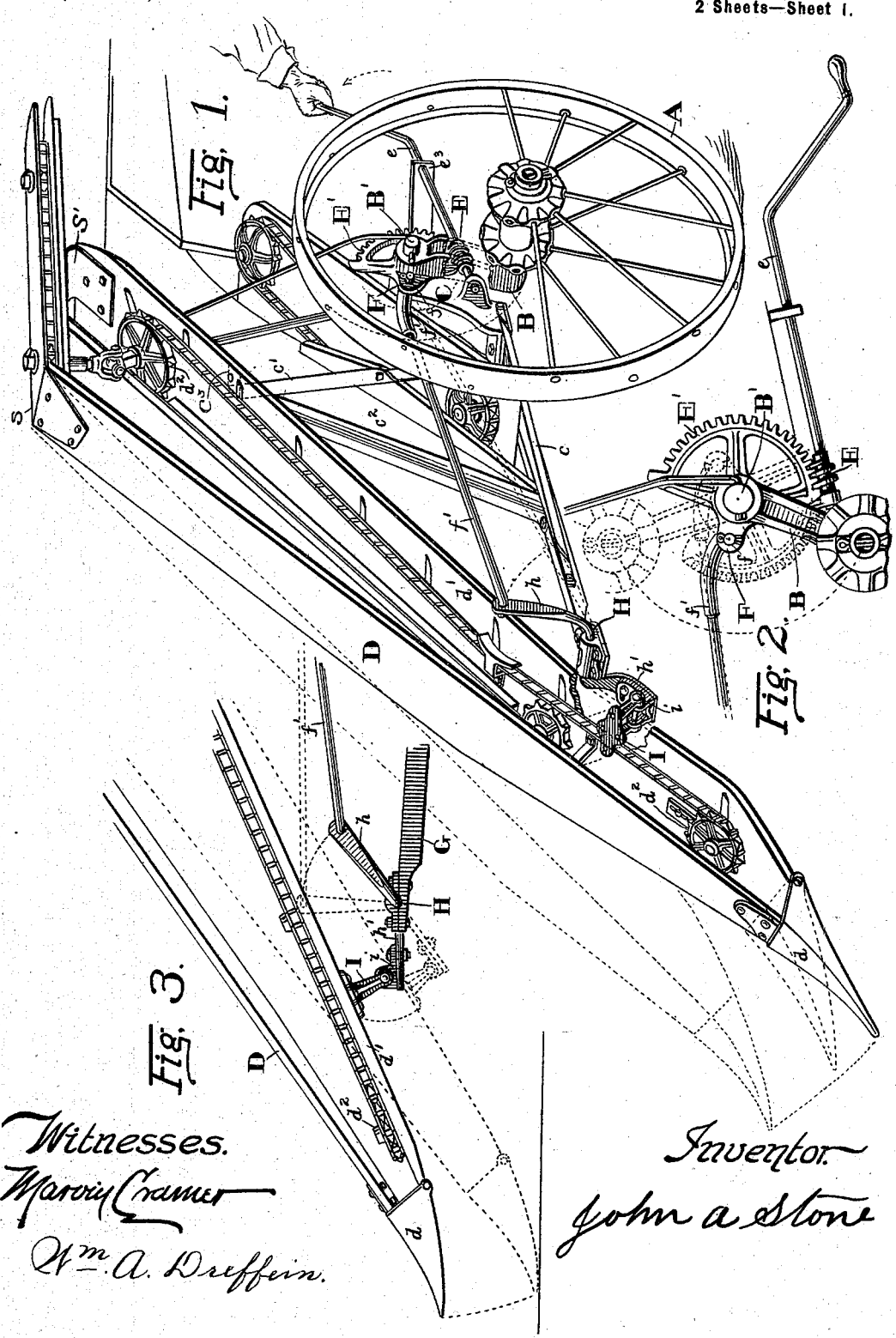
Witnesses.
Marvin Cramer
Wm. A. Dreffein.
Inventor.
John A. Stone

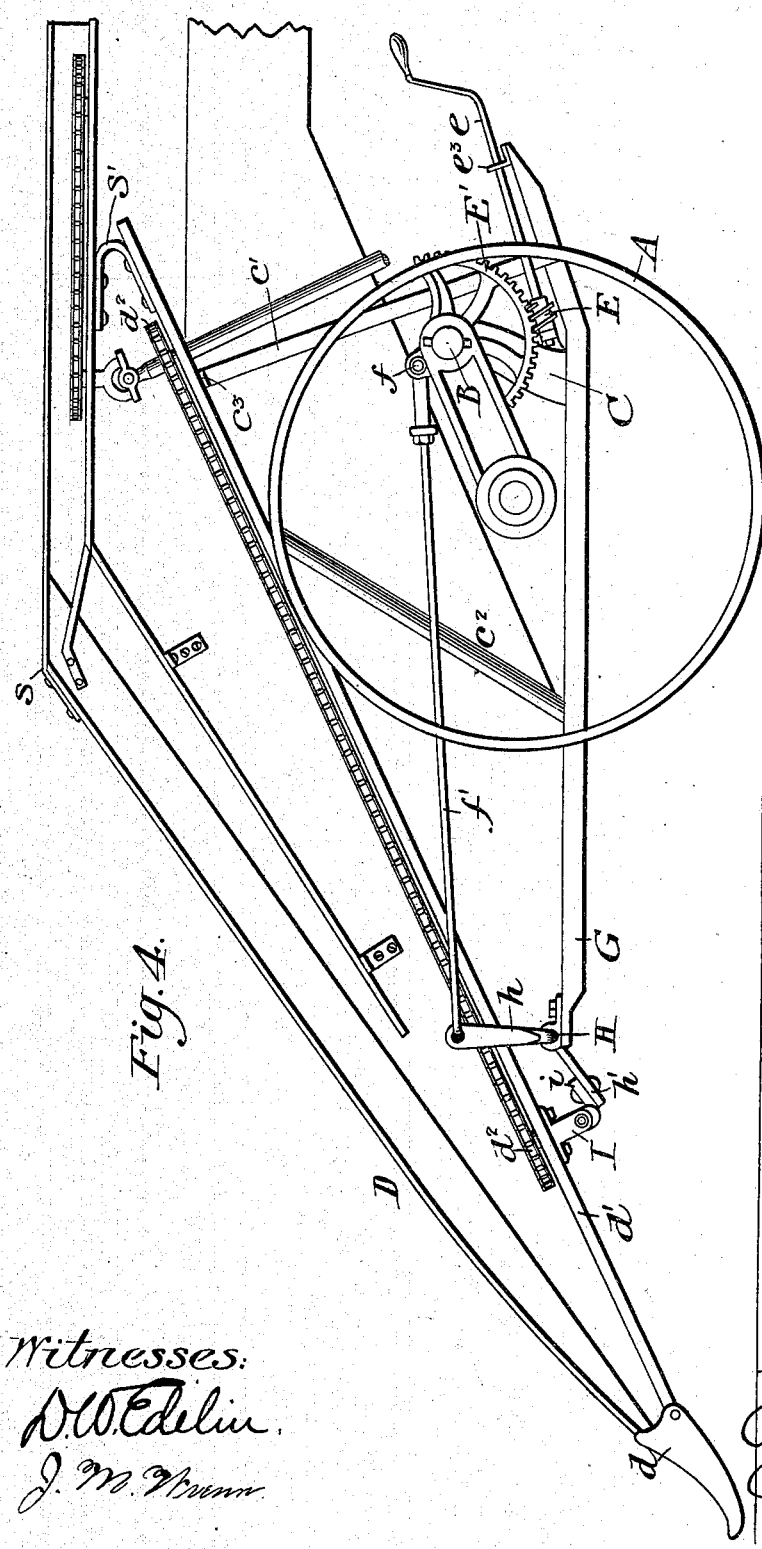

United States Patent Office.

JOHN A. STONE, OF CHICAGO, ILLINOIS, ASSIGNOR TO THE DEERING HARVESTER COMPANY, OF SAME PLACE.

CORN-HARVESTER.

SPECIFICATION forming part of Letters Patent No. 681,147, dated August 20, 1901.

Application filed May 7, 1900. Serial No. 15,866. (No model.)

*To all whom it may concern:*

Be it known that I, JOHN A. STONE, of Chicago, in the county of Cook and State of Illinois, have invented certain new and useful Improvements in Corn-Harvesters, of which the following is a full description, reference being had to the accompanying drawings, in which—

Figure 1 is a perspective view of such parts of a corn-harvester as necessary to show my invention. Figs. 2 and 3 are details. Fig. 4 is a side elevation of the parts shown in Fig. 1.

In that class of corn-harvesters shown in the patent granted to me December 26, 1899, No. 640,046, the row beside that previously cut is operated upon, in consequence of which the gathering devices are nearer the grain-side wheel than the other. Because of this it is usually only necessary to raise and lower the machine at the grain side; but in doing so the gatherer nearer the standing corn is raised and lowered more than its mate. Its mate is not shown in the present drawings, because the invention as shown is applicable to one or both, but necessarily more so to the one shown, so as to regulate the position of its point relative to the ground, as its vertical adjustment is greater than that of its mate.

In the drawings, A is the grain-wheel of a corn-binder as one part with the arm B, pivoted to the main supporting-axle B' of the machine.

C is a bracket secured to the main frame, adapted to sustain the grain-side end of the main supporting-axle and other parts. To this bracket is secured the forwardly-extending bar $c$.

$c'$ and $c^2$ are upwardly-extending posts that are secured at their lower ends to the frame, and to the upper end of the post $c'$ is secured the rear end of the main supporting-board $d'$ of the gathering device in the ordinary manner, so that the gatherer is supported in an elevated position above and beyond the main or platform frame of the machine, the upper end of the post $c'$ being turned over at an angle, as shown at $c^3$, to afford a proper connection.

D is the upper board of the grain-side gathering device; $d$, the flexible point of the said device.

$d'$ is the main supporting-board of the gathering device, carrying the chains operated by the usual sprocket-wheels $d^2$. The post which supports the rear end of the gathering device and the means whereby the gatherer is fastened to the upper end thereof is sufficiently flexible to allow the small amount of movement at this point that is required by the adjustment of the forward end of the device.

Upon the bracket C and in the arm $e^3$ of the main frame is journaled the screw E as one part with the crank-shaft $e$. As one piece with the arm B is the segment E'. When rotating the screw E, the arm B is caused to move in the arc of a circle, as shown in dotted lines in Fig. 2, and the grain side of the machine thus raised and lowered upon the supporting-wheel A.

Lowering the machine—say from the position shown in Fig. 1 to that shown in Fig. 2—the forward end of the gathering device would be moved too near the ground if no provision to avoid the same were made. As one piece with the arm B is the lug F, having the eye $f$, into which is hooked the link $f'$. Upon the forward end of the bar $c$ in the casting G is journaled a rock-shaft H, having the arms $h$ and $h'$. The link $f$ is hooked into an eye at the upper end of the arm $h$. Secured to the board $d'$ (see Fig. 3) is the bracket I, pivoted to a suitable bracket $i$ upon the arm $h'$.

The operation of the device is as follows: With the parts in the position shown in full lines in Figs. 1 and 2 and in dotted lines in Figs. 2 and 3, if the screw then be turned the rod $f'$ will be drawn and the arm $h$ moved to the position shown in full lines in Fig. 3. Through the instrumentality of this rock-shaft and its arm $h'$ the gathering device will be raised relative to the body of the machine as the latter is moved toward the ground. If desirable, the entire gathering device of a corn-binder may be controlled as here shown.

What I claim as my invention, and desire to secure by Letters Patent, is—

1. In a corn-harvester, the combination with the frame of the machine and its supporting-wheel, of a gathering device pivotally connected to the frame so as to rise and fall at its forward end, means for raising and lowering the frame on the supporting-wheel, and means for concurrently raising and lowering the front end of the gathering device in opposition to the movement of the frame.

2. In a corn-harvester, the combination with the frame of the machine and its supporting-wheel, of an arm pivotally connected to the frame and carrying the axle of the supporting-wheel, a gathering device pivoted to the frame so as to rise and fall at its forward end, means for adjusting the wheel-carrying arm so as to raise and lower the frame on the wheel, and a link connecting the gathering device with said arm so as to raise and lower the front end of the gathering device concurrently with and in opposition to the elevation or depression of the frame.

3. In a corn-harvester, the combination with the frame of the machine and its supporting-wheel, of an arm pivotally connected to the frame and carrying the axle, said arm having a gear-segment attached thereto, a gathering device pivoted to the frame so as to rise and fall at its forward end, a hand crank-shaft mounted on the machine-frame and having a worm meshing with the gear-segment on the axle-carrying arm, a rock-shaft mounted on the frame and having an arm connected to the gathering device, and a link connecting the axle-carrying arm with an arm on the rock-shaft, whereby when the machine-frame is raised or lowered on the supporting-wheel the front end of the gathering device is concurrently raised or lowered in the opposite direction.

JOHN A. STONE.

Witnesses:
WM. A. DREFFEIN,
JOHN W. DAVIS.